(12) United States Patent
Innes et al.

(10) Patent No.: US 9,369,656 B2
(45) Date of Patent: Jun. 14, 2016

(54) PREDICTING END OF BATTERY LIFE FOR A REMOTE CONTROLLER DEVICE

(71) Applicant: EchoStar Technologies L.L.C., Englewood, CO (US)

(72) Inventors: David Innes, Littleton, CO (US); Harold Jaramillo, Castle Rock, CO (US); Alan Terry Pattison, Castle Rock, CO (US); Jeremy Stephen Mickelsen, Denver, CO (US); Adam Michael Schafer, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 113 days.

(21) Appl. No.: 14/231,496

(22) Filed: Mar. 31, 2014

(65) Prior Publication Data

US 2015/0281625 A1 Oct. 1, 2015

(51) Int. Cl.
*G08B 21/00* (2006.01)
*H04N 5/44* (2011.01)
*G08C 17/02* (2006.01)
*H04N 21/422* (2011.01)
*H04N 21/488* (2011.01)
*G08C 23/04* (2006.01)

(52) U.S. Cl.
CPC .............. *H04N 5/4403* (2013.01); *G08C 17/02* (2013.01); *G08C 23/04* (2013.01); *H04N 21/42204* (2013.01); *H04N 21/4882* (2013.01); *G08C 2201/10* (2013.01); *H04N 2005/4408* (2013.01)

(58) Field of Classification Search
CPC .......................... H04N 5/4403; G08C 2201/10
USPC .......... 340/636.1–636.21; 320/132, 134, 136; 324/427, 428
See application file for complete search history.

(56) References Cited

U.S. PATENT DOCUMENTS 6,051,957 A * 4/2000 Klein ............................ 320/132
2009/0278701 A1 * 11/2009 Reams ..................... 340/636.15

* cited by examiner

*Primary Examiner* — Jeffery Hofsass
(74) *Attorney, Agent, or Firm* — Seed IP Law Group PLLC

(57) ABSTRACT

A remote control is powered by multiple batteries connected in series. The remote control includes a voltage comparison circuit configured to compare a midpoint voltage from a node connecting two of the batteries to a reference voltage. The remote control is able to determine if there is a non-uniform drain rate in the batteries based on the comparison.

19 Claims, 5 Drawing Sheets

PREDICTING END OF BATTERY LIFE FOR A REMOTE CONTROLLER DEVICE

BACKGROUND

1. Technical Field

The present application relates to the field of managing batteries in an electronic device. The present invention relates more particularly to predicting when the batteries in a remote control will die.

2. Description of the Related Art

Television receivers and many other kinds of electronic devices are controlled by a remote control. The remote control is to be powered by batteries. As a remote control transmits control signals to the television receiver, the voltage level of the batteries eventually drops below a level that can effectively powered remote control.

Some television receivers monitor the voltage level of the batteries in the remote control and when the voltage level drops below a certain point the television receiver outputs an indication that the batteries in the remote control are low and should be replaced or recharged. While this can be useful to the user of the remote control, often the low battery signal is given prematurely.

BRIEF SUMMARY

One embodiment of the present application is a method for predicting the remaining useful life cycle of the batteries in a remote control. The method includes periodically sending a signal from the remote control to a television receiver indicating the current voltage level of the batteries and the remote control. The television receiver stores the voltage values in a memory. The television receiver gathers data regarding the usage of the remote control. The television receiver calculates a predicted battery life curve based on the voltage values recorded in the memory and the usage data. Based on the predicted battery life curve, the television receiver estimates a remaining lifetime of the batteries.

In one embodiment, the usage data includes a number of times that the remote control has transmitted control signals to the television receiver and other devices. The television receiver utilizes the voltage levels and the usage data to determine how quickly the voltage of the batteries depletes with a particular amount of use. The television receiver then determines what type of batteries are in the remote control and can predict when the batteries will go dead at the current usage rate. When the television receiver determines that the batteries will be dead within a selected threshold time, the television receiver outputs an indication on a display indicating that the user should replace or recharge the batteries before the end of the threshold time.

DETAILED DESCRIPTION

Batteries are used to power a very large variety of electronic devices. These devices include remote controls, PDAs, MP3 players, smart phones, game controllers, laptop computers, tablets, headlamps, and many more devices. As a battery discharges the battery voltage gradually decreases until the electronic device can no longer be powered by the battery. At this point the user of the electronic device will replace or recharge the battery There are many types of battery cells, including lithium-ion, lead acid, Ni—Zn, Ni—Cd, NiMH, $Zn/MnO_2$, etc. Each type of battery has a particular voltage when fully charged. The voltage of each type of battery follows a particular curve as the battery discharges.

Figure 1:
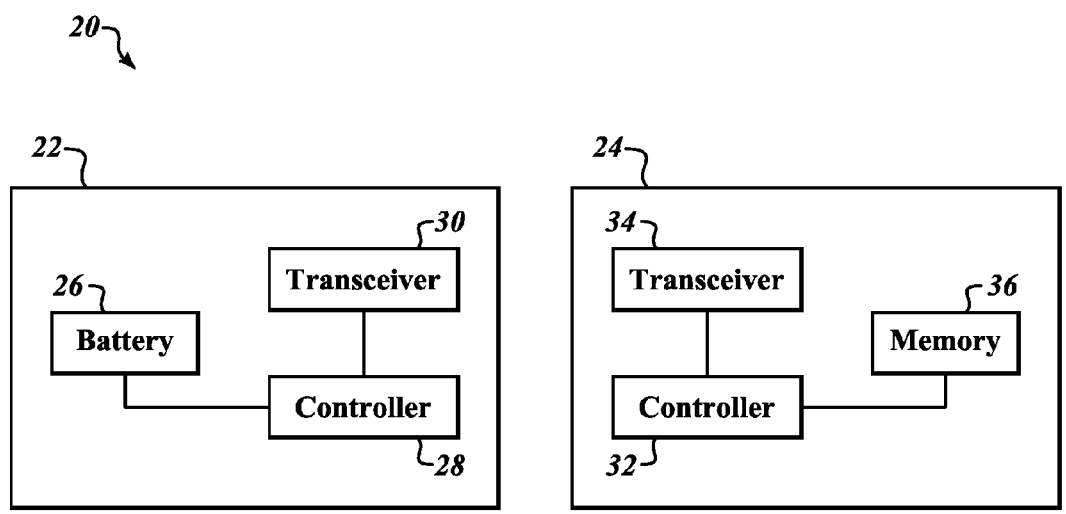
FIG. 1 is a block diagram of a system predicting the remaining lifetime of batteries in a remote control according to one embodiment.

FIG. 1 is a block diagram of a system 20. The system 20 includes a remote control 22 and an electronic device 24 configured to be controlled by the remote control 22. The remote control 22 includes a battery 26 coupled to a controller 28. The controller 28 is further coupled to a wireless transceiver 30. Electronic device 24 includes a controller 32 coupled to a wireless transceiver 34 and a memory 36.

The remote control 22 controls the electronic device 24 by transmitting control signals from the transceiver 30 to the electronic device 24. In particular, the controller 28 causes the transceiver 30 to transmit control signals according to input received from a user and instructions stored in a memory of the controller 28. The remote control 22 is powered by the battery 26.

The electronic device 24 receives the control signals from the remote control 22 and executes the commands contained in the control signals. In particular, the transceiver 34 receives the control signals transmitted by the transceiver 30 from the remote control 22. The controller 32 of the electronic device 24 decodes the control signals and executes the instructions contained in the control signals.

As the remote control 22 transmits control signals to the electronic device 24, the battery 26 gradually discharges. Each control signal transmitted by the remote control 22 depletes the battery 26 by a small amount. The accumulation of the transmission of many control signals from the remote control 22 eventually depletes the battery 26 to a point at which the battery 26 can no longer power the remote control 22. As the battery 26 discharges, the voltage across the terminals of the battery 26 decreases. The manner in which the voltage of the battery 26 decreases is particular to the chemical type of the battery 26 as well as the particular manufacture of the battery 26.

In many applications it is useful for the user of the remote control 22 to know when the battery is near the end of its life and should be recharged or replaced. For this reason, the controller 32 of the electronic device 24 executes a method for estimating a failure date of the battery 26 of the remote control 22.

In one embodiment, the controller 28 of the remote control 22 periodically measures the voltage across the terminals of the battery 26. The controller 28 then causes the transceiver 30 to transmit a battery voltage signal to the electronic device 24 including a voltage value indicating the current voltage of the battery 26. The transceiver 34 receives the battery voltage signal and the controller 32 decodes the battery voltage signal and stores the battery voltage value in the memory 36. Because the remote control 22 transmits a battery voltage signal periodically, the controller 32 stores each of the battery voltage values, corresponding to a particular date, in the memory 36. The memory 36 therefore contains a database or table indicating the voltage of the battery 26 at particular dates.

The controller 32 of the electronic device 24 also monitors the usage of the remote control 22. In particular, the electronic device 24 monitors how frequently the remote control 22 is used and stores this usage data in the memory 36. The controller 32 executes an algorithm that estimates a voltage curve of the battery 26 versus the amount discharged from the battery 26. The controller 32 then predicts, based on the voltage curve and the previous usage pattern of the remote control 22, a failure date of the battery 26 other remote control 22.

The electronic device 24 provides to the user of the remote control 22 a warning that the battery 26 of the remote control 22 should be replaced before the predicted failure date. In this way, the user of the remote control 22 can receive a relatively accurate warning that the batteries should be replaced soon. Because the predicted failure date is based on the usage pattern of the remote control 22 and the voltage values of the battery 26, the predicted failure date takes into account how the user uses the remote control 22. If the user uses the remote control 22 infrequently, then even in a case in which the voltage of the battery 26 is low, the battery 26 may yet have a long remaining lifetime because the user does not use the remote control very frequently. Likewise, if the user uses the remote control 22 very frequently, then even in a case in which the voltage of the battery 26 is not currently low the remaining life of the battery 26 may not be very long due to the frequent use of the remote control 22. Thus, the electronic device 24 can output a warning to the user to replace or recharge the battery 26 before a particular date even though the voltage of the battery 26 is not currently low.

This provides several advantages over a system in which the electronic device 24 outputs a low battery indication when the voltage on the battery 26 drops below a particular level. In a case in which a user uses the remote control infrequently, when the voltage of the battery 26 drops below the threshold for outputting the low battery signal, the user may yet have to suffer through a low battery indication for several months before the battery actually dies. Or, alternatively, the user may prematurely replace or recharge the battery 26 when there were many months left of battery life. In a case in which a user uses the remote control very frequently, the low battery signal may come on too late for the user to replace or recharge the battery 26 before the battery 26 dies.

In one embodiment, the electronic device 24 includes data stored in the memory 36 corresponding to a plurality of characteristic voltage curves of many types of batteries. As the voltage on the battery 26 decreases, the controller 32 can predict what type of battery 26 is in the remote control 22 by comparing the voltage values stored in the memory 36 to the characteristic voltage curves stored in the memory 36. In this way the controller 32 can determine whether the battery is a lithium-ion battery, a Ni—Zn battery, etc. By fitting the voltage values to one of the characteristic voltage curves, the controller 32 can predict, in conjunction with the remote control usage data, when the battery will die.

In one embodiment, the electronic device 24 is a television receiver configured to receive media content from a television service provider such as a satellite television provider, a cable television provider, a terrestrial broadcast television provider, etc. The television receiver 24 outputs media content such as television shows, movies, etc. on a display coupled to the television receiver 24. The remote control 22 controls the television receiver 24, allowing a user to change the channel on the television receiver, access and electronic programming guide, access other menu options, etc.

As a user uses the remote control 22, the remote control 22 periodically transmits the battery voltage signals to the television receiver 24 as described previously. The television receiver 24 also collects remote control usage data indicating usage patterns of the remote control 22. In one embodiment, the television receiver 24 keeps track of the number of buttons pressed on remote control 22 or the number of control signals transmitted from the remote control 22 and stores data regarding this remote control usage in the memory 36. The controller 32 can also store data regarding usage of the remote control on particular days of the week or times a day.

The controller 32 of the television receiver 24 predicts a failure date of the battery 26 other remote control 22 based on the usage data, the voltage values, and characteristic curves stored in the memory 36 as described previously. When the predicted failure date is within a threshold time, the television receiver 24 outputs a message on the display indicating to the user that remote control battery 26 should be replaced or recharged before the predicted failure date. The message can indicate a specific date by which the battery should be replaced or recharged, a time range during which the battery 26 should be replaced or recharged, etc. In this manner the user of the remote control 22 is reliably notified that the battery 26 should be replaced soon.

Electronic device 24 can be any kind of electronic device configured to be controlled by a remote control 22. Such devices can include a game console, a stereo system, a remote control vehicle, a television, a DVD player, a home appliance, or any other electronic device that can be controlled by a remote control.

The remote control 22 can be a battery-powered device other than just a remote control. For example, the battery-powered device 22 can be a remote control vehicle, a PDA, an MP3 player, a smart phone, a game controller, a laptop computer, a tablet, an automobile, a headlamp, or any other applicable device. In other embodiments the battery powered device 22 can include devices connected to AC power having battery backup, such as a fire alarm, a carbon monoxide alarm, or other suitable devices. The controller 28 of a battery powered device 22 can collect the battery voltage values, the usage pattern, and the characteristic curves and can use them to predict the failure date of the battery 26 in the same manner as described previously with respect to the electronic device 24.

While the remote control 22 has been described above as having a single battery 26, those of skill in the art will understand that the remote control 22 can include multiple batteries 26 connected in series or in parallel. The battery voltage signals transmitted from the remote control 22 can include the total voltage across a plurality of batteries 26 connected in series or the total voltage across a plurality of batteries connected in parallel.

In one embodiment, when the battery 26 has been replaced or recharged, the controller 32 can use the voltage values from the previous usage cycle of the remote control 22 to more accurately predict a failure date of the new or recharged battery 26 of the remote control 22. For example, if the first several voltage values of the new battery 26 are similar to those of the previous battery, then the controller 32 can quickly generate an accurate voltage-discharge curve of the battery 26 based on the previous voltage values and usage history. Thus the controller 32 can store in the memory 36 multiple cycles of battery voltage and usage data, each cycle corresponding to the lifecycle of a battery 26 used in the remote control 22.

Figure 2:
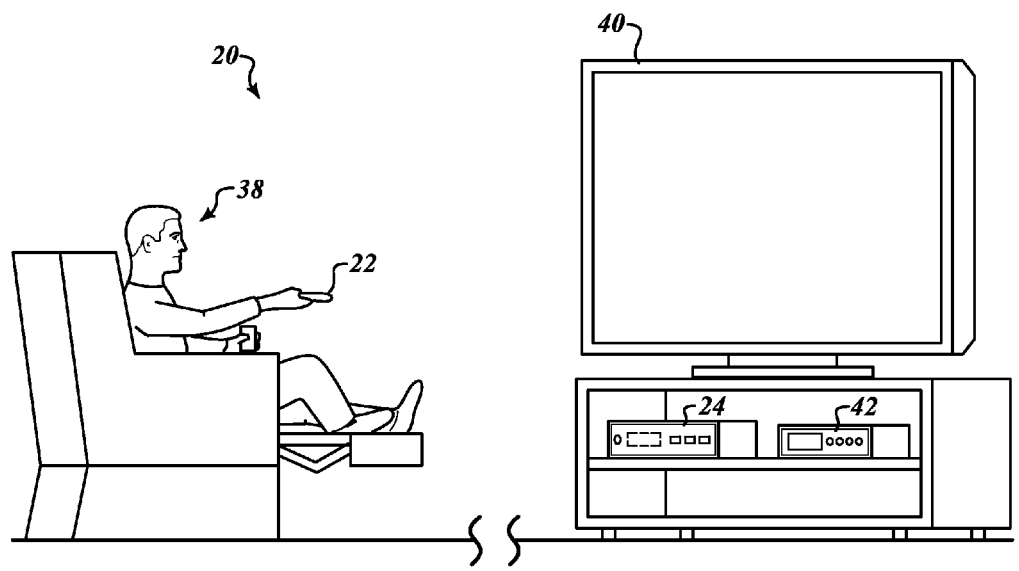
FIG. 2 is an illustration of a home entertainment system including a television receiver that predicts the remaining lifetime of batteries and a remote control according to one embodiment.

FIG. 2 illustrates a home entertainment system 20 including a remote control 22 controlled by a user 38, a television receiver 24, a television coupled to the television receiver 24, and on electronic entertainment device 42.

The television receiver 24 is, for example, a television receiver for a satellite or cable television provider. The television receiver 24 receives television programming signals from the satellite or cable television provider and displays them on a television 40. The user 38 uses the remote control 22 to control the television receiver 24 in order to display media content from a desired television channel, to operate a DVR associated with the television receiver 24, or to perform other functions common to television receivers 24. The remote control 22 can also directly control the television 40 and the electronic entertainment device 42.

The remote control 22 is powered by a battery 26 as described previously. The remote control 22 periodically transmits the battery voltage signals to the television receiver 24. The battery voltage signals include a voltage value indicating the voltage of the battery 26. In one example, the remote control 22 transmits a battery voltage signal to the television receiver once each day. However, the remote control can transmit the battery voltage signal hourly, weekly, or according to any other suitable schedule.

In one example, the user 38 of the remote control 22 watches television or other media programs very frequently and thus uses the remote control 22 to control the television receiver 24 several hours each day. Each time that the remote control 22 performs a function, the battery 26 is discharged by a small amount. However, because the user 38 uses the remote control 22 a great deal each day, the battery 26 discharges relatively quickly. In this case the battery 26 may last only a few months or weeks due to the heavy usage of the remote control 22

In one example, the user 38 of the remote control watches television or other media programs infrequently, and thus uses the remote control 22 sparingly. Because the user 38 uses the remote control infrequently, the battery 26 discharges relatively slowly. In this case it is possible for the battery 26 the last several years without needing to be recharged or replaced.

The television receiver 24 is configured to monitor the usage pattern of the remote control 22. The television receiver 24 stories in memory 36 data regarding the usage the remote control 22. The television receiver 24 can accumulate data such as the number of times that the remote control transmits a control signal each day, week, or month. The television receiver 24 can also accumulate data regarding usage of the remote control to control the television receiver 24, the television 40, and the electronic media device 42. In this way, the television receiver 24 can store in the memory 36 data regarding the usage pattern of the remote control 22.

In one embodiment, the television receiver 24 is configured to store in the memory 36 data regarding characteristic battery voltage-discharge curves for multiple types of batteries. The battery voltage discharge curves can indicate how the voltage of each type of battery changes with respect to the percent of total discharged from the battery.

The television receiver 24 predicts a predicted failure date of the battery 26 based on the battery voltage values, the usage pattern data, and the characteristic battery voltage discharge curves. In particular, the television receiver 24 refers to the battery voltage values, the dates associated with the battery voltage values, and the usage pattern data stored in memory 36 and compares the data to the characteristic voltage discharge curves. The television receiver 24 then fits the data to one of the characteristic curves to determine which type of battery 26 is in the remote control 22. Once the television receiver 24 has determined what type of battery is in the remote control 22, the television receiver 24 continues to monitor the voltage values and usage data to fine tune a predicted voltage discharge curve for the battery 26 in the remote control 22. The predicted voltage discharge curve provides an estimation of a date at which the battery 26 will longer be able to power the remote control 22 based on the usage pattern up to the current time.

When the predicted battery failure date is near, the television receiver 24 outputs a message on the television 40 indicating that the user should replace or recharge the battery 26 by a certain date or simply sometime in the near future. In past systems, a low battery message was displayed based only on the then current voltage of the battery 26. This led to the situation in which a user 38 that uses the remote control 22 infrequently may be prompted to replace the battery 26 far ahead of the time that the battery 26 will actually fail. Because the television receiver 24, according to principles of the present disclosure, outputs this message based on the usage pattern of the remote control and not only the voltage of the battery 26, the message is displayed in a timely fashion such that the user is not prompted to replace the battery far ahead of the time that the battery will actually fail. Thus the user will not waste money buying new batteries more frequently than needed. Or, alternatively, the user will not waste time recharging the battery 26 more frequently the needed.

In one embodiment, the transceiver 30 of the remote control 22 includes both IR and RF transmitters. Thus, the remote control 22 can transmit both IR and RF control signals. In one embodiment, the transceiver 34 of the television receiver 24 includes both IR and RF receivers. The IR and RF receivers respectively receiver IR and RF control signals from the remote control 22.

The television receiver 24 stores in the memory 36 data regarding the number of IR and RF control signals transmitted by the remote control 22. The television receiver 22 can thus gather data regarding how many transitions per day are transmitted by the remote control 22. The television receiver can compare this data to the voltage values received each day from the remote control 22 and can thus identify the change in voltage of the battery with respect to a certain number of control signals transmitted by the remote control 22. This allows the television receiver 24 to accurately estimate a voltage—discharge curve for the battery 26.

In one embodiment, the television receiver 24 can detect when the remote control 22 transmits control signals to a television 40 or the electronic media device 42. Thus the television receiver 24 can gather total usage data of the remote control 22 and not data indicating how frequently the remote control 22 controls the television receiver 24. This enables the television receiver 24 to make a more accurate prediction of the battery failure date.

In an alternative example, the remote control 22 stores data regarding the usage of the remote control 22. This usage data can include the number of pulses transmitted by the remote control, the number functions performed by the remote control etc. The remote control 22 can transmit the usage data to the television receiver 24. The television receiver 24 can thus use the voltage values and the usage data received from the remote control 22 to predict the failure date of the battery 26 of the remote control 22.

In a further embodiment, the remote control 22 calculates the predicted failure date of the battery 26. In this case, the remote control 22 stores the voltage values, the usage data, the characteristic discharge curves, etc. and estimates a voltage—discharge curve of the battery 26 of the remote control 22. In other words, the remote control 22 performs the data storing and estimating functions ascribed to the television receiver 24 above.

While particular examples of ways to accurately estimate a failure date of the battery 26 has been described above, those of skill in art will recognize that many other methods can be used to predict a failure date of the battery 26 in light of the present disclosure. All such other ways follow from the scope of the present disclosure.

Figure 3:
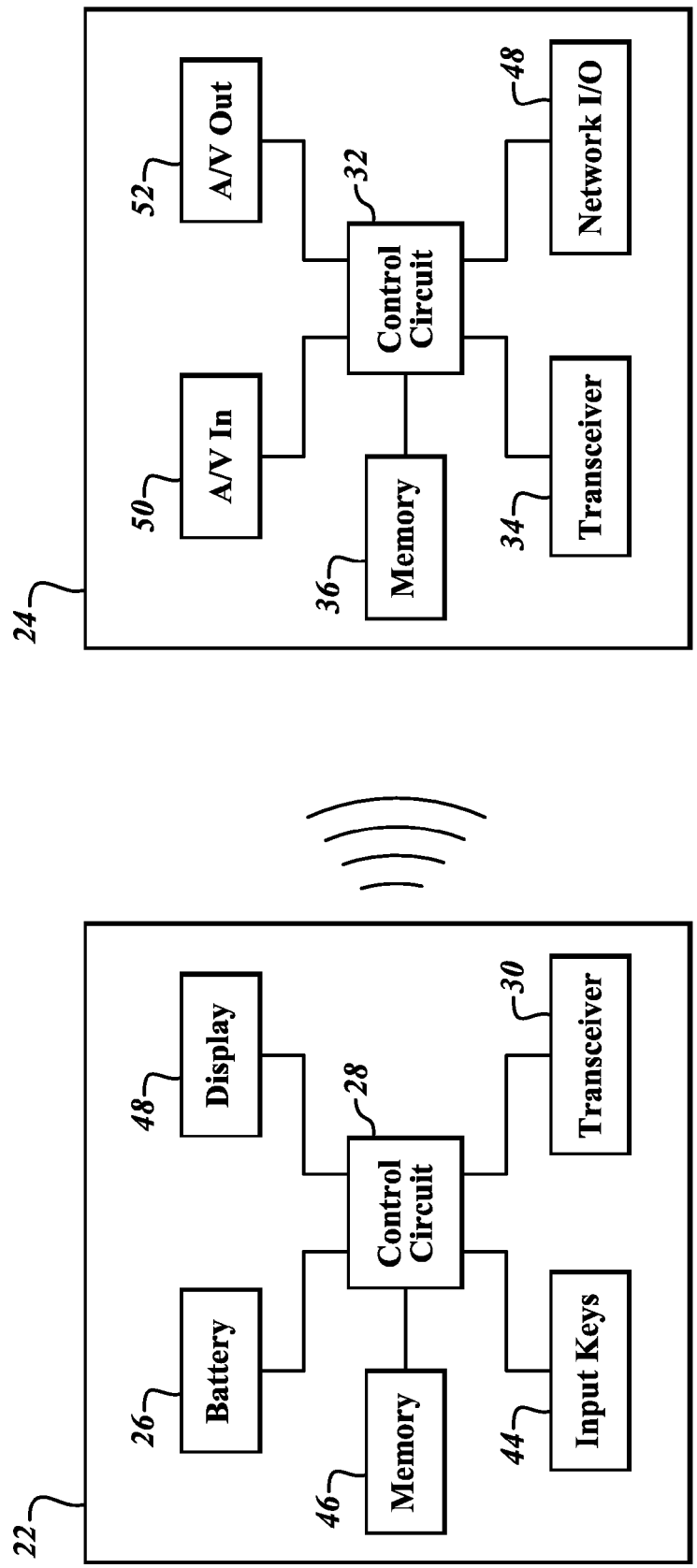
FIG. 3 is a block diagram of remote control and the television receiver according to one embodiment.

FIG. 3 is a block diagram of a remote control 22 and a television receiver 24 according to one embodiment. The remote control 22 includes a control circuit 28 powered by battery 26. The remote control 22 includes a transceiver 30, input keys 44, a memory 46, and a display 48 each coupled to the control circuit 28 and powered by the battery 26.

The television receiver 24 includes a control circuit 32. The television receiver 24 further includes a transceiver 34, a memory 36, a network I/O 48, and AN input 50, and AN output 52 each coupled to the control circuit 32.

The control circuit 28 of the remote control 22 causes the transceiver 30 to transmit control signals to the television receiver 24. The transceiver 30 can include IR and RF receivers and transmitters. The transceiver 30 can therefore transmit IR and RF control signals to the television receiver 24 and to other electronic devices.

The control circuit 28 periodically measures the voltage of the battery 26. The control circuit 28 causes the transceiver 34 to transmit battery voltage signals to the television receiver 24. The battery voltage signals includes voltage values indicating the voltage of the battery 26 at the time the measurement is made. Thus, the television receiver 24 periodically receives battery voltage data from the remote control 22 and the television receiver 24 stores the voltage values in the memory 36 as described previously.

A user 38 of the remote control 22 can operate the input keys 44 of the remote control 22 to transmit control signals to the television receiver 24. The input keys can include standard input keys such as number keys, video playback keys such as fast-forward, reverse, pause, play, and stop, menu keys, DVR control keys, and any other suitable input keys. By pressing the input keys 44 the user 38 can cause the remote control 22 to transmit the control signals to the television receiver 24 or to other electronic devices.

The memory 46 includes software instructions for the operation of the remote control 22. The control circuit 28 reads the software instructions from the memory 46 and executes the software instructions accordingly. The memory 46 can also include identification codes used for identifying the remote control 22, for identifying particular commands sent with the control codes, and for identifying the television receiver 24 and other electronic devices. As described previously, the memory 46 can also store voltage values, remote control usage data, and characteristic battery voltage—discharge curves.

The display 48 of the remote control 22 can provide indications to the user 38 that the battery 26 is low and should be replaced. The display 48 can include LEDs, and LCD screen, or any other suitable components for providing notifications from the remote control 22 to the user 38.

The control circuit 32 of the television receiver 24 stores data regarding the usage of the remote control 22 in the memory 36. In one embodiment, the control circuit 32 stores, in the memory 36, data regarding the number of control signals received from the remote control 22 by the transceiver 34. The usage data therefore includes data regarding the number of control signals sent from the remote control 22.

The memory 36 also contains data regarding characteristic battery voltage-discharge curves for the various chemical types of batteries. The memory 36 therefore includes voltage-discharge curves for lithium-ion batteries, lead acid batteries, N—Zn batteries, Ni—Cd batteries, NiMH batteries, and $Zn/MnO_2$ batteries.

As described previously, the television receiver 24 predicts a failure date of the battery 26 based on the battery voltage values, the usage pattern data, and the characteristic battery voltage discharge curves. In particular, the television receiver 24 refers to the battery voltage values, the dates associated with the battery voltage values, and the usage pattern data stored in memory 36 and compares these data to the characteristic voltage discharge curves. The television receiver 24 then fits the data to one of the characteristic curves to determine which type of battery is in the remote control 22. Once the television receiver 24 has determined what type of battery is in the remote control 22, the television receiver 24 continues to monitor the voltage values and usage data to fine tune a predicted voltage discharge curve for the battery 26 in the remote control 22. The predicted voltage discharge curve provides an estimation of a date at which the battery 26 will longer be able to power the remote control 22 based on the usage pattern up to the current time. When the predicted battery failure date is near, the television receiver 24 outputs a message on the television 40 via the AN output 52 indicating that the user should replace or recharge the battery 26 by a certain date or sometime in the near future.

In one embodiment the control circuit 28 of the remote control 22 predicts a failure date of the battery 26 based on the battery voltage values, the usage pattern data, and the characteristic battery voltage discharge curves stored in the memory 46. In other words, the remote control 22 can perform the functions ascribed to the control circuit 32 of the television receiver 24 in calculating a failure date of the battery 26. The remote control 22 can transmit to the television receiver 24 a signal indicating the predicted failure date of the battery 26. The television receiver 24 can then cause the television 40 to display an indication of the failure date to the user. Alternatively, the display 48 of the remote control 22 can display an indication of the predicted failure date of the battery and/or a message indicating that the user should replace the battery 26.

Figure 4:
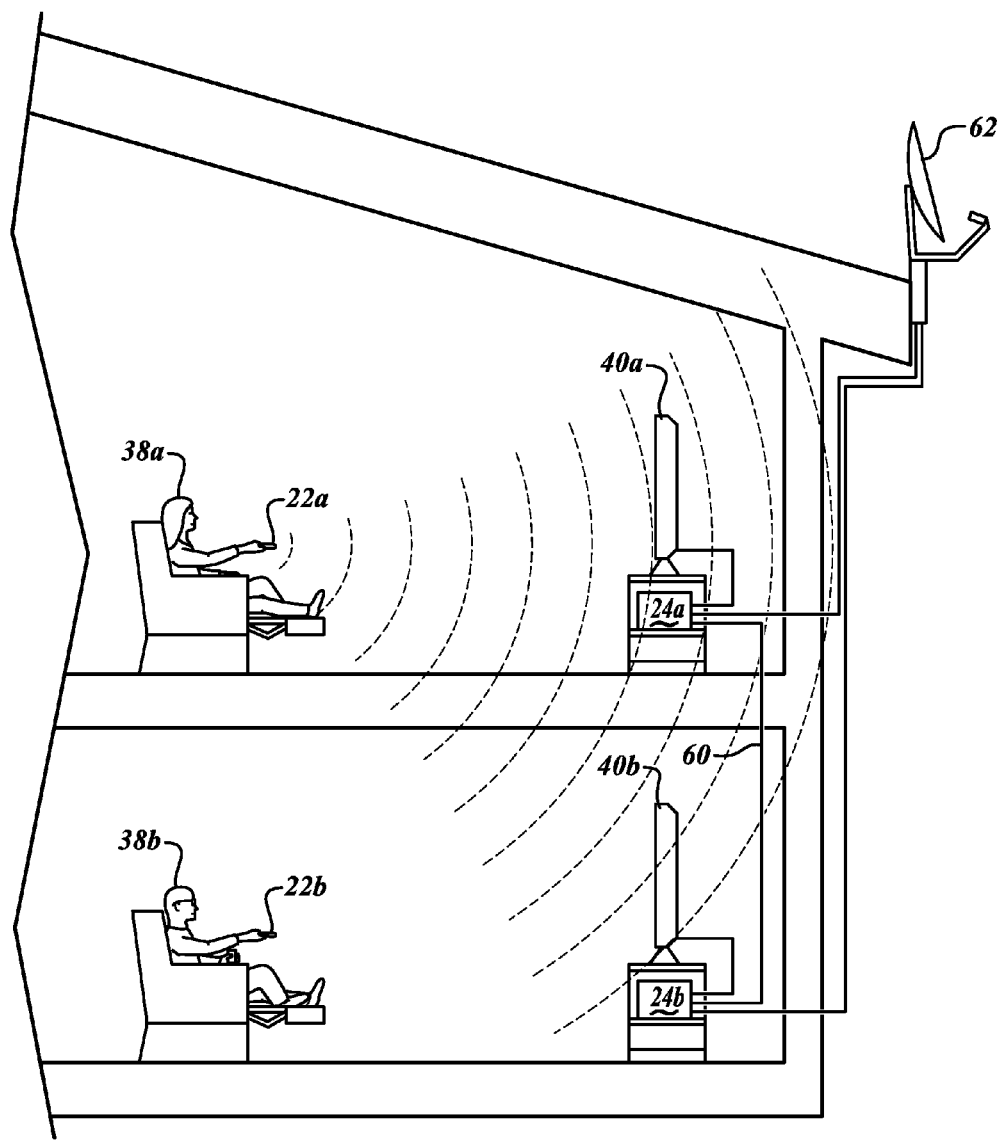
FIG. 4 is an illustration of a residential setting including multiple television receivers and remote controls according to one embodiment.

FIG. 4 is an illustration of a residential setting including two television receivers 24a and 24b, two remote controls 22a and 22b, and two televisions 40a and 40b. Two users 38a and 38b are operating the remote controls 22a and 22b respectively. The television receivers 24a and 24b are connected by network connection 60. A satellite receiver 62 provides media content to the television receivers 24a and 24b.

The television receivers 24a and 24b receive battery voltage signals from the remote controls 22a and 22b. In particular, the television receiver 24a receives battery voltage signals from the remote control 22a. The television receiver 24b receives battery voltage signals from the remote control 22b. The television receiver 24a records usage data regarding the usage of the remote control 22a. The television receiver 24b records usage data regarding the usage of the remote control 22b.

It is possible that the remote controls 22a and 22b can be switched such that the remote control 22b controls the television receiver 24a and the remote control 22a controls the television receiver 24b. The remote controls 22a and 22b transmit with their control signals and battery voltage signals an identification code that identifies the remote control 22a or 22b. The television receivers 24a and 24b can store usage data regarding each remote control 22a and 22b. Furthermore, the television receivers 24a and 24b can share with each other, via a network connection 60, the voltage values and usage data for each of the remote controls 22a and 22b. In this way, the television receivers 24a and 24b can each make accurate estimations of voltage battery failure dates for each of the remote controls 22a and 22b. Each of the television receivers 24a and 24b can display a battery replacement message that corresponds to the remote control 22a or 22b currently controlling that television receiver.

Figure 5:
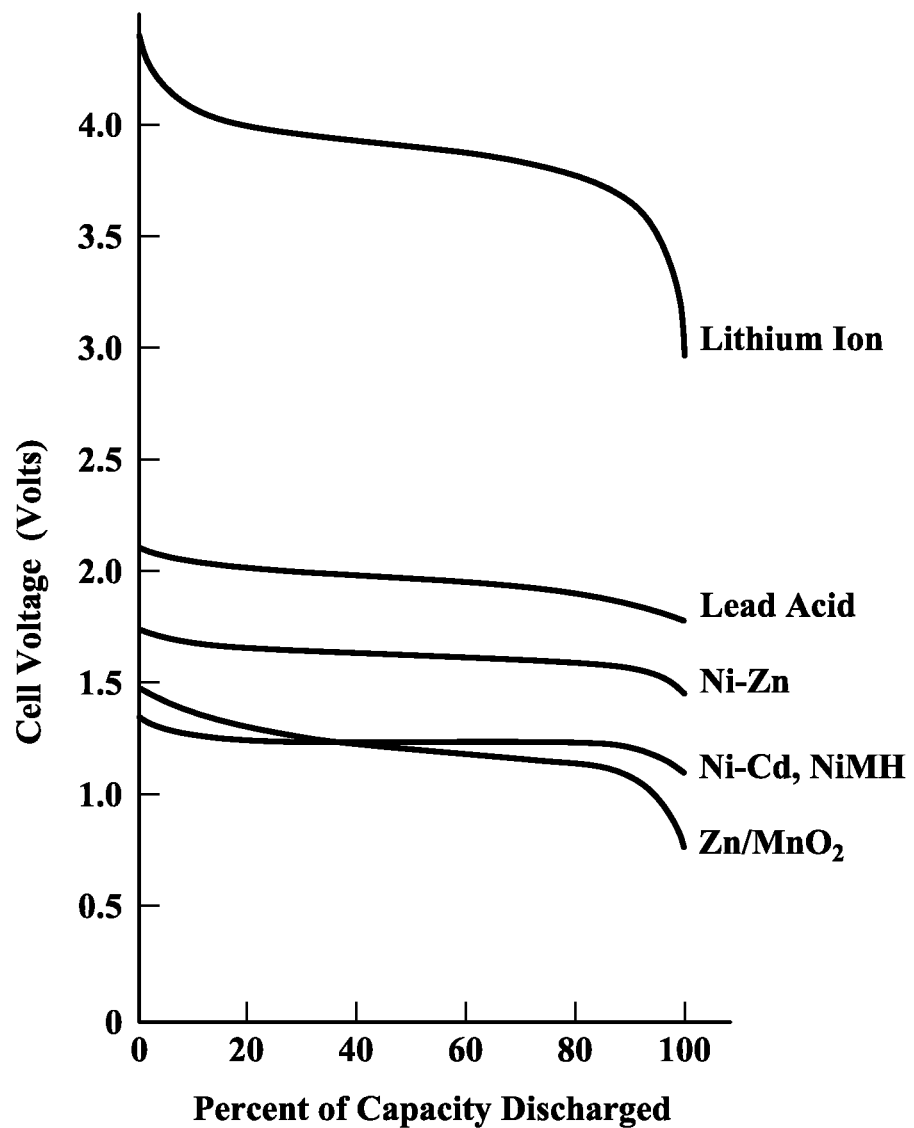
FIG. 5 is a graph of the cell voltage of various batteries versus the percent of capacity discharged according to one embodiment.

FIG. 5 is graph illustrating the characteristic battery voltage discharge curves for the different types of batteries. In particular, the graph of FIG. 5 shows the voltage across different types of batteries against the percentage of capacity discharged. It is known that the voltage of a battery cell is determined by the specific chemistry of the battery. Furthermore, the rate of change in the voltage of the battery as the battery discharges is different for each type of battery. For example, a lithium ion battery cell has a higher voltage than most other cells and also experiences a sharper change in the voltage at the beginning and end of its life cycle than many other kinds of batteries. Lead-acid, Nickel-Zinc, Nickel-Cadmium, Nickel-metal-hydride, and Zinc-Magnesium oxide batteries all have different voltages and decay curves. Data representing these characteristic voltage-discharge curves can be saved in the memory 36 of the television receiver 24. The characteristic voltage-discharge curves can be used to predict the type of battery 26 in the remote control 22. The characteristic voltage—discharge curves can also be used to estimate a voltage discharge curve for the particular battery 26 in the remote control 22 as described previously.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   transmitting a plurality of voltage values of a battery in a remote control from the remote control to a electronic device;
   storing in a memory of the electronic device the plurality of battery voltage values;
   storing in the memory of the electronic device remote control usage data indicative of usage of the remote control during a selected period of time;
   calculating, based on the remote control usage data and the plurality of voltage values, an estimated time until failure of the battery; and
   outputting to a display a notification indicating the estimated time.

2. The method of claim 1 wherein the remote control usage data includes data indicative of when the remote control controls the electronic device and a second electronic device.

3. The method of claim 2 wherein the remote control usage data indicates the number of times that buttons of the remote control have been pressed.

4. The method of claim 3, further comprising:
   calculating a discharge curve for the battery based on the voltage values and a plurality of generic discharge curves each corresponding to a particular type of battery; and
   calculating the estimated time based on the discharge curve.

5. The method of claim 4 wherein calculating the discharge curve includes predicting a type of the battery based on the voltage values and the generic discharge curves.

6. A method, comprising:
   storing in a memory a plurality of voltage values each corresponding to a measured voltage of a battery in a remote control at a respective time, wherein the remote control includes an IR transmitter;
   storing in the memory data regarding remote control usage, wherein the remote control usage data indicates how many times the IR transmitter has transmitted a signal;
   calculating, in a processor, an estimated battery failure date based on the plurality of battery voltage values and the data regarding remote control usage; and
   outputting to a display a notification indicating that the battery should be replaced based on the estimated battery failure date.

7. The method of claim 6 wherein the remote control usage data indicates how many times remote control buttons have been pushed.

8. The method of claim 6 wherein the remote control includes an RF transmitter and the remote control usage data indicates how many times the RF transmitter has transmitted a signal.

9. The method of claim 6, further comprising:
   predicting a type of battery in the remote control based on the plurality of voltage values; and
   calculating the estimated battery failure date based on the type of battery in the remote control.

10. The method of claim 9, further comprising:
    storing in the memory a plurality of battery discharge curves each for a respective battery type, the respective curves indicating a discharge state of the respective battery type based on a voltage state of the respective battery type; and
    predicting the type of the battery in the remote control based on the battery discharge curves and the plurality of voltage values.

11. The method of claim 6, wherein the memory and processor are housed in a electronic device configured to be controlled by the remote control.

12. The method of claim 11, further comprising transmitting the voltage values from the remote control to the electronic device.

13. The method of claim 12 wherein the processor and memory are housed in the remote control.

14. The method of claim 6 wherein the notification indicates the estimated battery failure date.

15. An electronic device, comprising:
    a wireless receiver configured to receive from a remote control a plurality of voltage values of a battery of the remote control;
    a memory configured to store the voltage values and remote control usage data; and
    a processor configured to estimate a failure time of the battery based on the voltage values and the usage data and to output to a display a notification indicating that the battery should be replaced.

16. The electronic device of claim 15 wherein the processor is configured to estimate the failure time of the battery further based on a characteristic battery voltage curve stored in the memory.

17. The electronic device of claim 16 wherein the processor is configured to estimate a remote control battery voltage curve for the battery of the remote control based on the characteristic battery voltage curve, the voltage values, and the remote control usage data.

18. The method of claim 1 wherein the electronic device is a television receiver.

19. The electronic device of claim 15 wherein the electronic device is a television receiver.

* * * * *